(12) United States Patent
Bucci et al.

(10) Patent No.: US 9,399,467 B2
(45) Date of Patent: Jul. 26, 2016

(54) METHOD AND SYSTEM FOR CONTROLLING ALTERNATOR VOLTAGE DURING A REMOTE ENGINE START EVENT

(71) Applicant: Honda Motor Co., Ltd., Tokyo (JP)

(72) Inventors: Andrew M. Bucci, Hilliard, OH (US); Brian K. Lickfelt, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 330 days.

(21) Appl. No.: 14/027,290

(22) Filed: Sep. 16, 2013

(65) Prior Publication Data

US 2015/0075493 A1    Mar. 19, 2015

(51) Int. Cl.
| | |
|---|---|
| *F02N 11/08* | (2006.01) |
| *G05D 1/00* | (2006.01) |
| *B60W 30/192* | (2012.01) |
| *B60L 11/18* | (2006.01) |
| *B60L 15/20* | (2006.01) |

(52) U.S. Cl.
CPC .......... *B60W 30/192* (2013.01); *B60L 11/1851* (2013.01); *B60L 15/2045* (2013.01); *F02N 11/0807* (2013.01); *Y02T 10/645* (2013.01); *Y02T 10/705* (2013.01); *Y02T 10/7005* (2013.01); *Y02T 10/72* (2013.01); *Y02T 10/7283* (2013.01)

(58) Field of Classification Search
CPC ................. B60R 25/04; B60R 25/029; F02N 2200/0809; F02N 2200/0813; F02N 2200/102; F02N 11/0807; F02N 11/0811; F02N 11/0803; F02N 11/0814; F02N 11/0822
USPC ................... 123/179.3, 179.2, 339.18; 701/2; 290/38 R, 38 E, 40 C, 40 B
See application file for complete search history.

(56) References Cited

U.S. PATENT DOCUMENTS

| | | | | |
|---|---|---|---|---|
| 5,611,751 A | * | 3/1997 | Ehrenhardt | B60K 17/28 477/107 |
| 5,942,988 A | * | 8/1999 | Snyder | F02N 11/0807 123/179.4 |
| 6,561,151 B1 | * | 5/2003 | Wisnia | F02N 11/0848 123/179.2 |
| 6,635,974 B1 | * | 10/2003 | Karuppana | H02J 1/14 307/10.1 |
| 6,809,428 B1 | | 10/2004 | Blackburn et al. | |
| 7,777,993 B2 | | 8/2010 | Sakamoto | |
| 8,112,185 B2 | * | 2/2012 | Wu | B60R 25/045 123/179.12 |
| 2002/0000791 A1 | * | 1/2002 | Taniguchi | H02J 7/1446 322/28 |

(Continued)

FOREIGN PATENT DOCUMENTS

| | | |
|---|---|---|
| JP | 2002266675 | 9/2002 |
| JP | 2006240550 | 9/2006 |
| KR | 20110018672 | 2/2011 |

*Primary Examiner* — Lindsay Low
*Assistant Examiner* — George Jin
(74) *Attorney, Agent, or Firm* — Rankin, Hill & Clark LLP

(57) ABSTRACT

A method and system for controlling alternator voltage during a remote engine start ("RES") event is provided. The method includes receiving an RES command into at least one control unit of the system. The method further includes starting an engine in response to receiving the RES command and operating an alternator in a first voltage mode where the alternator is operating at a first voltage V1 to charge a vehicle battery. The method further includes detecting a brake pedal has been pressed with a brake switch. The method further includes operating the alternator in a second voltage mode where the alternator is operating at a second voltage V2, which is less than the first voltage V1, to charge the vehicle battery based on detecting the brake pedal has been pressed.

19 Claims, 2 Drawing Sheets

(56) References Cited

U.S. PATENT DOCUMENTS

| | | | |
|---|---|---|---|
| 2004/0111199 A1* | 6/2004 | Javaherian | F02N 11/0807 701/36 |
| 2004/0144351 A1* | 7/2004 | Janisch | B60R 25/04 123/179.2 |
| 2006/0271247 A1* | 11/2006 | Matsuura | B60R 25/209 701/2 |
| 2009/0251284 A1* | 10/2009 | Wilson | F02N 11/103 340/5.64 |
| 2011/0163718 A1* | 7/2011 | Van Wiemeersch | B60R 16/033 320/109 |
| 2011/0197844 A1 | 8/2011 | Matsubara | |
| 2011/0231034 A1* | 9/2011 | Kinser | B60K 6/46 701/2 |
| 2012/0078443 A1 | 3/2012 | Matsubara | |
| 2012/0232765 A1* | 9/2012 | Holub | B60R 25/08 701/66 |
| 2013/0154281 A1* | 6/2013 | Sullivan | H02J 7/1446 290/40 B |

* cited by examiner

METHOD AND SYSTEM FOR CONTROLLING ALTERNATOR VOLTAGE DURING A REMOTE ENGINE START EVENT

BACKGROUND

Many remote engine start ("RES") systems apply a time limit, e.g., ten minutes, to how long a vehicle engine can idle while no one is inside the vehicle. When the engine starts, it draws a significant amount of power from the vehicle battery. After the engine starts, the alternator recharges the battery. In very cold temperatures, charging the battery can take a long time. To adequately recharge the battery within the time limit associated with remote engine starting (e.g., ten minutes), a voltage regulation set point of the alternator can be adjusted from a normal value (e.g., 15.2 volts) to a higher value (e.g., 16 volts) after the engine is started by the RES system.

When the alternator is operating at 16 volts, however, many electrical components in the vehicle may not operate properly. Typically, these components are disabled during an RES event and it is preferred that there is no overlap between the 16 volt mode of the alternator and the time when these electrical components are turned ON. Because the alternator voltage cannot change instantaneously and there is some communication delay, there is a possibility that the alternator voltage is greater than 15.2 volts when these certain electrical components are turned ON.

SUMMARY

An example of a method for controlling alternator voltage during a remote engine start event that may overcome at least one of the aforementioned shortcomings includes receiving a remote engine start command into at least one control unit of a vehicle control system. The method further includes starting an engine in response to receiving the remote engine start command and operating an alternator operatively connected with the engine in a first voltage mode where the alternator is operating at a first voltage V1 to charge a vehicle battery. The method further includes detecting a brake pedal has been pressed with a brake switch in communication with the at least one control unit of the vehicle control system. The method further includes operating the alternator in a second voltage mode where the alternator is operating at a second voltage V2, which is less than the first voltage V1, to charge the vehicle battery based on detecting the brake pedal has been pressed.

An example of a system for controlling alternator voltage during a remote engine start event includes a receiver, a brake switch, a windshield wiper switch, and at least one control unit. The receiver is configured to receive a remote engine start command. The brake switch is for detecting whether a brake pedal is pressed. The windshield wiper switch operatively connects with at least one windshield wiper. The at least one control unit is in communication with an engine, an alternator operatively connected with the engine, a vehicle battery electrically connected with the alternator, the receiver, the brake switch, the windshield wiper switch and the vehicle battery. The at least one control unit is configured to operate the alternator in a first voltage mode where the alternator is operating at a first voltage V1 to charge the vehicle battery. The at least one control unit is also configured to detect a brake pedal has been pressed via a signal received from the brake switch. The at least one control unit is also configured to operate the alternator in a second voltage mode where the alternator is operating at a second voltage V2, which is less than the first voltage V1, to charge the vehicle battery based on the signal from the brake switch indicating that the brake pedal is pressed.

DETAILED DESCRIPTION

Figure 1:
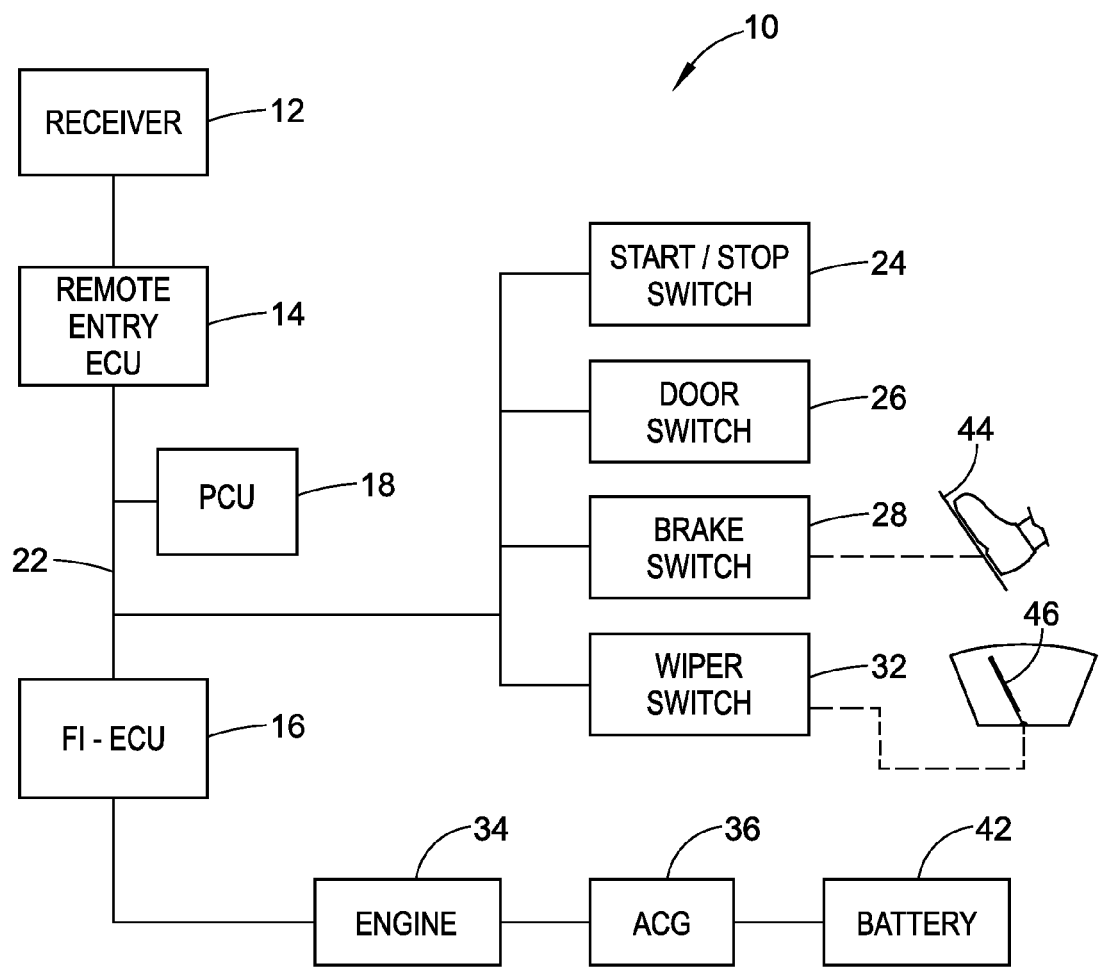
FIG. 1 is a schematic depiction of a system for controlling alternator voltage during an RES event along with an engine, an alternator, and a battery of a vehicle.

FIG. 1 depicts a vehicle control system 10 (hereinafter "system") for controlling alternator voltage during a RES event. The system includes a receiver 12 configured to receive a remote engine start command and at least one control unit in communication with the receiver 12. In the illustrated embodiment, three control units are shown: a remote entry electronic control unit ("remote entry ECU") 14, a fuel injection electronic control unit ("FI-ECU") 16, and a power control unit ("PCU") 18. The remote entry ECU 14, the FI-ECU 16, and the PCU 18 are interconnected via a vehicle bus 22. The system 10 also includes a start/stop switch 24, a door switch 26, a brake switch 28, and a wiper switch 32 each of which are connected to the vehicle bus 22. The system 10 operates to control a vehicle engine 34 and an alternator 36, which is operatively connected with the engine 34 and is electrically connected with a vehicle battery 42.

The receiver 12 is configured to receive a remote engine start command, which is typically a command embedded in a wireless signal generated by a key fob or other transmitter (not shown) when an operator of the vehicle desires to turn ON the engine 34 without being in the vehicle. The receiver 12 is in electrical communication with the remote entry ECU 14, which is also configured to receive other commands from the fob or remote transmitter via the receiver 12, such as locking and unlocking of vehicle doors.

The PCU 18 can operate as a general control unit for the vehicle and communicate with the remote entry ECU 14 and the FI-ECU 16 via the vehicle bus 22. The PCU 18 can also monitor the mode, e.g., ON or OFF, OPEN or CLOSED, in which the start/stop switch 24, the door switch 26, the brake switch 28, and the wiper switch 32 reside. This will be described in more detail below with reference to FIG. 2.

The start/stop switch 24 is a switch that is activated by the driver to turn on the engine 34 in a typical manner when the driver of the vehicle is located inside the vehicle. The start/stop switch 24 can be in communication with a start button (not shown) that is depressed by the driver to operate the vehicle. The start/stop switch 24 can also be in operable communication with a key cylinder to determine when the key has been rotated in an effort to turn the engine 34 ON.

The door switch 26 determines the state of the driver door, e.g., OPEN or CLOSED. The door switch 26 can change between a CLOSED position, which indicates that the driver door (not shown) is CLOSED, and in open position, which indicates that the driver door is OPEN. These positions can also be in the form of flags that are 0 and 1. For example, flag 0 can indicate the driver door is CLOSED and flag 1 can indicate that the driver door is OPEN.

The brake switch 28 is for detecting whether a brake pedal 44 is pressed. The brake switch 28 can operate between an OFF position, which is indicative of the brake pedal 44 not being depressed, and in ON position, which is indicative of the brake pedal 44 being pressed. These ON/OFF positions can also be in the form of flags that are 0 and 1.

The windshield wiper switch 32 is operatively connected with at least one windshield wiper 46. The windshield wiper switch 32 controls power delivery to a motor (not shown) connected with the windshield wiper. The windshield wiper switch 32 can change between an OFF position, where power is not provided to the windshield wiper motor, and an ON position, where power is provided to the windshield wiper motor. These ON/OFF positions can also be in the form of flags that are 0 and 1.

Figure 2:
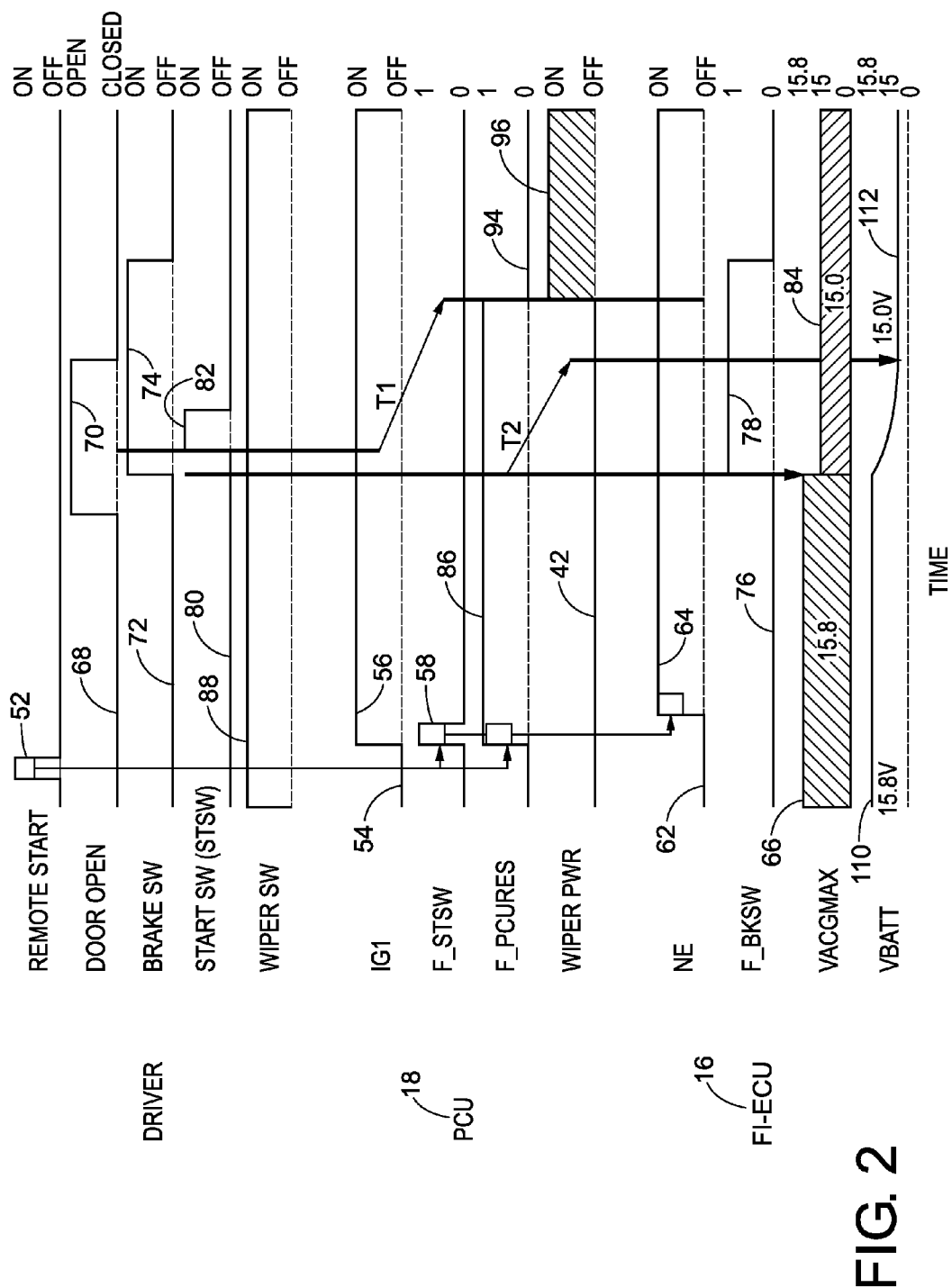
FIG. 2 depicts the status of components of the system for controlling alternator voltage during a remote engine start event over a period of time.

A method for controlling alternator voltage during an RES event will be described with reference to FIG. 2. FIG. 2 depicts actions taken by the driver of the vehicle at REMOTE START, DOOR, BRAKE SW, START SW (STSW) and WIPER PWR. FIG. 2 depicts states monitored by the PCU 18 at IG1, F_STSW, F_PCURES and WIPER SW. FIG. 2 also depicts states monitored by the FI-ECU 16 at NE, F_BKSW, VACGMAX and VBATT.

The method for controlling alternator voltage during an RES event includes receiving an RES command into at least one control unit of the vehicle control system 10. As seen in FIG. 2, the driver initiates a remote engine start command at 52 by performing a function with the remote transmitter (not shown) such that a signal is sent to the receiver 12 which is received into at least one control unit, which in the depicted embodiment is the remote entry ECU 14.

The method for controlling alternator voltage during a remote engine start event further includes starting the engine 34 in response to receiving the remote engine start command. As seen at IG1 in FIG. 2, the ignition changes from an OFF position designated by line 54 to an ON position designed by line 56 in response to receiving the remote engine start command. Receiving the remote engine start command also results in the PCU 18 changing a starter switch flag ("F_STSW") from "0" to "1" at 58, which results in the engine 34 (FIG. 1) turning from OFF as depicted by line 62 to ON as depicted by line 64.

The method further includes operating the alternator 36 (FIG. 1) operatively connected with the engine 34 (FIG. 1) in a first voltage mode, as depicted by line 66. When in the first voltage mode, the alternator 36 is operating at a first voltage V1 (15.8 volts in the example shown in FIG. 2), to charge the vehicle battery 42 (FIG. 1). As discussed above, when the engine 34 starts, it draws a significant amount of power from the battery 42. It is the alternator 36 that recharges the battery 42. The first voltage V1 is a higher value from a typical voltage for the alternator 36. This allows for a quicker recharging of the battery 42 as compared to using a more normal (lower) voltage value.

The method further includes detecting that the brake pedal 44 (FIG. 1) has been pressed with the brake switch 28 (FIG. 1). Line 68 depicts the door switch 26 indicating that the driver door is in the CLOSED position. When the driver opens the driver door the state of the door switch 26 changes to OPEN at line 70. The operator then steps on the brake pedal 44 (FIG. 1) which changes the brake switch 28 (FIG. 1) from the OFF position, as depicted by line 72, to the ON position, as depicted by line 74. Line 74 is indicative that the brake pedal 44 is being pressed. Line 72 is indicative of the brake pedal 44 not being pressed. When the brake switch 28 is OFF, the FI-ECU 16 sets the brake flag switch ("F_BKSW") to 0 as indicated by line 76. When the brake switch 28 is ON, the FI-ECU 16 sets the brake flag switch ("F_BKSW") to 1 as indicated by line 78.

The driver then presses the start/stop switch 24 (FIG. 1) changing the state of the start/stop switch 24 from OFF, as depicted at line 80, to ON, as depicted at line 82. It is the driver opening the door, pressing the brake pedal 44 (FIG. 1), and pressing the start/stop button, which is connected with the start/stop switch 24 (FIG. 1), that typically ends the RES event, although there is typically a predetermined time delay T1, which will be described in more detail below.

The method for controlling alternator voltage during the RES event further includes operating the alternator 36 (FIG. 2) in a second voltage mode, as depicted by line 84. In the second voltage mode, the alternator 36 is operating at a second voltage V2, which is less than the first voltage V1, to charge the vehicle battery 42 (FIG. 1). The alternator 36 operates in this second voltage mode (line 84) based on detecting the brake pedal 44 (FIG. 1) has been pressed. When the brake switch 28 changes from OFF (line 72) to ON (line 74), the alternator 36 changes from the first voltage mode (line 66) to the second voltage mode (line 84).

The method further includes operating in an RES mode, as indicated by line 86, based on receiving the RES command at 52. When the driver initiates RES (at 52), the PCU 18 changes an RES flag (F_PCURES) from 0, which indicates no RES event, to 1, which indicates an RES event. The windshield wipers 46 (FIG. 1) are disabled during the RES mode. Line 88 indicates that the driver has placed the wiper switch 32 (FIG. 1) in the ON position prior to initiating the RES command at 52. As such, power should be delivered through the wiper switch 32 to operate the windshield wipers 46 nearly instantaneously after receiving the RES command. The PCU 18, however, limits wiper power during the RES event as seen by line 92, which indicates no wiper power is being delivered to the wiper motors until after the RES event ends as indicated by line 94. When the RES event ends (the transition between line 86 and line 94), then wiper power is delivered to the wipers as indicated at line 96. If wiper power was to be delivered to the wiper motor(s) during the RES event (see line 86), there is a risk that too large a voltage would be passed on to the wiper motor, which could result in a malfunction.

The alternator 36 (FIG. 1) operates in the first voltage mode (see line 66) in the RES mode (see line 86) prior to detecting the brake pedal 44 (FIG. 1) has been pressed, which is indicated by the transition between line 72 and line 74. The alternator 36 operates in the second voltage mode (see line 84) in the remote engine start mode (see line 86) after detecting the brake pedal 44 (FIG. 1) has been pressed, which is again indicated between the transition of line 72 and line 74. The method for controlling alternator voltage during the RES event further includes detecting that the start switch 24 has been actuated, which is indicated by the transition between line 80 and line 82. The RES mode (see line 86) is ended in response to detecting that the brake pedal 44 (FIG. 1) has been pressed, which is indicated as the transition between line 72 and line 74, and that the start/stop switch 24 (FIG. 1) has been actuated, which is indicated by the transition between line 80 and line 82.

The method further includes pausing a predetermined amount of time T1 after detecting the start/stop switch 24 (FIG. 1) has been actuated prior to ending the RES mode. This predetermined amount of time T1 can be programmed into processing logic software stored in the PCU 18, and can also be a function of communication delay. As seen in FIG. 2, even though the alternator 36 (FIG. 1) can change from the first voltage mode (line 66) to the second voltage mode (line 84) nearly instantaneously, the voltage being delivered from the alternator 36 cannot change instantaneously from V1 (see line 110) to the second voltage V2 (see line 112). The time T2 that it takes the alternator 36 (FIG. 1) to transition from the first voltage V1 to the second voltage V2 is less than T1, which is the time between the driver actuating the start/stop switch 24 (FIG. 1) and the end of the RES event. In the illustrated embodiment, T1 equals 158 milliseconds and T2 equals 68 milliseconds.

As such, the system 10 for controlling alternator voltage during a remote engine start event allows for the reduction in voltage to the lower voltage V2 prior to providing wiper power at line 96, which reduces the likelihood of wiper malfunction due to too large of voltage being delivered to the wiper motor. Also, the transition from the first voltage mode (line 66) to the second voltage mode (line 84) is based on detection of the brake switch 28 (FIG. 1) indicating that the brake pedal 44 (FIG. 1) has been pressed. This occurs prior to the start button, which is connected with the start/stop switch 24, being pressed. Accordingly, the perceived delay between the engine starting and power being delivered to the wipers 46 is minimized.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for controlling alternator voltage during a remote engine start event, the method comprising:
   receiving a remote engine start command into at least one control unit of a vehicle control system;
   starting an engine in response to receiving the remote engine start command;
   operating an alternator operatively connected with the engine in a first voltage mode where the alternator is operating at a first voltage V1 to charge a vehicle battery;
   detecting a brake pedal has been pressed with a brake switch in communication with the at least one control unit of the vehicle control system; and
   operating the alternator in a second voltage mode where the alternator is operating at a second voltage V2, which is less than the first voltage V1, to charge the vehicle battery based on detecting the brake pedal has been pressed.

2. The method of claim 1, further comprising operating in remote engine start mode based on receiving the remote engine start command, wherein windshield wipers are disabled during the remote engine start mode.

3. The method of claim 2, wherein the alternator operates in the first voltage mode while in the remote engine start mode prior to detecting the brake pedal has been pressed.

4. The method of claim 3, wherein the alternator operates in the second voltage mode in the remote engine start mode after detecting the brake pedal has been pressed.

5. The method of claim 2, further comprising:
   detecting a start switch in communication with the at least one control unit has been actuated; and
   ending the remote engine start mode in response to detecting the brake pedal has been pressed and the start switch has been actuated.

6. The method of claim 5, further comprising pausing a predetermined amount of time after detecting the start switch has been actuated prior to ending the remote engine start mode.

7. The method of claim 6, wherein the alternator is configured to provide the second voltage V2 to charge the vehicle battery in less than the predetermined amount of time after being switched from the first voltage mode to the second voltage mode.

8. The method of claim 7, wherein the predetermined amount of time is about 158 ms, and the alternator is configured to provide the second voltage V2 to charge the vehicle battery in less than 68 ms after being switched from the first voltage mode to the second voltage mode.

9. The method of claim 1, wherein V1 is about 15.8 volts and V2 is about 15 volts.

10. The method of claim 1, further comprising:
    detecting a start switch in communication with the at least one control unit has been actuated; and
    delivering power to a windshield wiper motor after waiting a predetermined amount of time from when the start switch was actuated.

11. The method of claim 10, wherein the alternator is configured to provide the second voltage V2 to charge the vehicle battery in less than the predetermined amount of time after being switched from the first voltage mode to the second voltage mode.

12. A system for controlling alternator voltage during a remote engine start event, the system comprising:
    a receiver configured to receive a remote engine start command;
    a brake switch for detecting whether a brake pedal is pressed;
    a windshield wiper switch operatively connected with at least one windshield wiper; and
    at least one control unit in communication with an engine, an alternator operatively connected with the engine, a vehicle battery electrically connected with the alternator, the receiver, the brake switch, the windshield wiper switch and the vehicle battery,
    wherein the at least one control unit is configured to operate the alternator in a first voltage mode where the alternator is operating at a first voltage V1 to charge the vehicle battery,
    wherein the at least one control unit is configured to detect a brake pedal has been pressed with the brake switch; and
    wherein the at least one control unit is configured to operate the alternator in a second voltage mode where the alternator is operating at a second voltage V2, which is less than the first voltage V1, to charge the vehicle battery based on a signal from the brake switch indicating that the brake pedal is pressed.

13. The system of claim 12, wherein the at least one control unit is configured to place the system in a remote engine start mode based on receiving the remote engine start command, wherein the at least one control unit is configured to preclude power delivery to the at least one windshield wiper while in the remote engine start mode.

14. The system of claim 12, wherein the at least one control unit is configured to operate the alternator in a first voltage mode while the system is in the remote engine start mode prior to receiving the signal from the brake switch indicating that the brake pedal is pressed, wherein the alternator is operating at a first voltage V1 to charge the vehicle battery when in the first voltage mode.

15. The system of claim 14, wherein the at least one control unit is configured to operate the alternator in a second voltage mode while the system is in the remote engine start mode after receiving the signal from the brake switch indicating that the brake pedal is pressed, wherein the alternator is operating at a second voltage V2 to charge the vehicle battery when in the second voltage mode and V2<V1.

16. The system of claim 15, further comprising a start switch in communication with the at least one control unit, wherein the at least one control unit is configured to end the remote engine start mode in response to detecting the brake pedal has been pressed and the start switch has been actuated.

17. The system of claim 16, wherein the at least one control unit is configured to pause a predetermined amount of time after detecting the start switch has been actuated prior to ending the remote engine start mode.

18. The system of claim 17, wherein the alternator is configured to provide the second voltage V2 to charge the vehicle battery in less than the predetermined amount of time after being switched from the first voltage mode to the second voltage mode.

19. The system of claim 12, wherein the at least one control unit includes a fuel injection electronic control unit for controlling the engine and the alternator and a power control unit for controlling power to the windshield wiper switch.

* * * * *